United States Patent
Rollins et al.

(10) Patent No.: US 11,074,663 B2
(45) Date of Patent: Jul. 27, 2021

(54) SYSTEM AND METHOD OF FACILITATING INTELLECTUAL PROPERTY TRANSACTIONS

(71) Applicant: Camelot UK Bidco Limited, London (GB)

(72) Inventors: Jason E. Rollins, San Francisco, CA (US); Penelope L. Peng, San Diego, CA (US)

(73) Assignee: Camelot UK Bidco Limited, London (GB)

(*) Notice: Subject to any disclaimer, the term of this patent is extended or adjusted under 35 U.S.C. 154(b) by 615 days.

(21) Appl. No.: 15/007,641

(22) Filed: Jan. 27, 2016

(65) Prior Publication Data

US 2017/0193619 A1    Jul. 6, 2017

Related U.S. Application Data

(60) Provisional application No. 62/273,732, filed on Dec. 31, 2015.

(51) Int. Cl.
*G06Q 50/18* (2012.01)
*G06Q 10/10* (2012.01)

(52) U.S. Cl.
CPC ......... *G06Q 50/184* (2013.01); *G06Q 10/101* (2013.01); *G06Q 50/18* (2013.01); *G06Q 2220/18* (2013.01)

(58) Field of Classification Search
CPC ............................. G06Q 50/184; G06Q 30/06
See application file for complete search history.

(56) References Cited

U.S. PATENT DOCUMENTS

| | | | |
|---|---|---|---|
| 8,518,423 B2 | 8/2013 | Watanabe et al. | |
| 9,014,661 B2 | 4/2015 | deCharms | |
| 9,135,787 B1 | 9/2015 | Russell et al. | |
| 2004/0186738 A1* | 9/2004 | Reisman | G06Q 10/10 705/26.1 |
| 2014/0025560 A1* | 1/2014 | Kwitek | G06Q 30/06 705/37 |
| 2014/0164262 A1 | 6/2014 | Graham | |

(Continued)

FOREIGN PATENT DOCUMENTS

| CN | 1823706 B | 8/2006 |
|---|---|---|
| WO | WO 2015/024129 | 2/2015 |

(Continued)

OTHER PUBLICATIONS

Palmer (Year: 2015).*

(Continued)

*Primary Examiner* — Jan P Mincarelli
(74) *Attorney, Agent, or Firm* — Oblon, McClelland, Maier & Neustadt, L.L.P.

(57) ABSTRACT

A system and method is provided for the facilitation of secure intellectual property transactions. The system may receive intellectual property information from system users. The system may match system users based on the provided intellectual property information to facilitate the initiation of an intellectual property transaction. The system may further provide a secure audit trail of all activity that occurs surrounding the intellectual property transaction, thereby increasing levels of trust between the involved parties.

11 Claims, 4 Drawing Sheets

(56) References Cited

U.S. PATENT DOCUMENTS

| | | | |
|---|---|---|---|
| 2014/0344015 | A1 | 11/2014 | Puertolas-Montanes et al. |
| 2014/0368601 | A1 | 12/2014 | deCharms |
| 2014/0379590 | A1* | 12/2014 | Germeraad .......... G06Q 50/184 |
| | | | 705/310 |
| 2015/0081566 | A1 | 3/2015 | Slepinin |
| 2015/0120567 | A1 | 4/2015 | Van Rooyen et al. |
| 2015/0127940 | A1 | 5/2015 | Polehn et al. |
| 2015/0170112 | A1 | 6/2015 | DeCastro |
| 2015/0205929 | A1 | 7/2015 | Brama |
| 2015/0206106 | A1* | 7/2015 | Yago .................... G06F 21/645 |
| | | | 705/68 |
| 2015/0244690 | A1 | 8/2015 | Mossbarger |
| 2015/0262137 | A1 | 9/2015 | Armstrong |
| 2015/0262138 | A1 | 9/2015 | Hudon |
| 2015/0262139 | A1 | 9/2015 | Shtylman |
| 2015/0262140 | A1 | 9/2015 | Armstrong |
| 2015/0262141 | A1 | 9/2015 | Rebernik et al. |
| 2015/0262168 | A1 | 9/2015 | Armstrong |
| 2015/0262171 | A1 | 9/2015 | Langschaedel et al. |
| 2015/0262172 | A1 | 9/2015 | Rebernik |
| 2015/0262176 | A1 | 9/2015 | Langschaedel et al. |
| 2015/0269624 | A1 | 9/2015 | Cheng et al. |
| 2015/0278820 | A1 | 10/2015 | Meadows |
| 2015/0278887 | A1 | 10/2015 | Almond |
| 2015/0379510 | A1* | 12/2015 | Smith ................ G06Q 20/3829 |
| | | | 705/71 |
| 2016/0191243 | A1* | 6/2016 | Manning ................ H04L 9/321 |
| | | | 713/168 |

FOREIGN PATENT DOCUMENTS

| | | | |
|---|---|---|---|
| WO | WO 2015/116998 | 8/2015 | |
| WO | WO-2017083565 A1 * | 5/2017 | ........... G06Q 20/385 |

OTHER PUBLICATIONS

Pete Rizzo, "Eris COO: Private and Public Blockchains Need to Coexist," Aug. 2, 2015, available online at https://www.coindesk.com/eris-coo-private-and-public-blockchains-need-to-co-exist. (Year: 2015).*

Rizzo, Pete, "Eris COO: Private and Public Blockchains Need to Co-Exist", Retrieved from the Internet: <URL:http://www.coindesk.com/eris-coo-private-and-public-blockchains-need-to-co-exist>, XP055358967, Aug. 2, 2015, 6 pages.

European Office Action dated Nov. 11, 2020 in corresponding European Application Serial No. 16 843 210.2 (14 pages).

Szabo, Nick, "The Idea of Smart Contracts", printed from http://szabo.best.vwh.net/idea.html, copyright 1997, 2 pages.

https://www.ethereum.org, Ethereum Foundation (Stiftung Ethereum), Zug, Switzerland, copyright 2016, printed Apr. 26, 2016, 11 pages.

https://erisindustries.com, Eris Industries, copyright 2014, printed Apr. 26, 2016, 6 pages.

https://smartcontract.com, "Smart Contracts are Self-Executing Contractual States, Stored on the Blockchain", SmartContract, copyright 2016, printed Apr. 26, 2016, 5 pages.

https://proofofexistence.com, Proof of Existence, copyright 2012-2015, printed Apr. 26, 2016, 20 pages.

* cited by examiner

SYSTEM AND METHOD OF FACILITATING INTELLECTUAL PROPERTY TRANSACTIONS

RELATED APPLICATIONS

This application claims the benefit of priority under 35 U.S.C. § 119(e) to U.S. Provisional Application No. 62/273,732, filed Dec. 31, 2015, which is incorporated herein by reference in its entirety.

FIELD OF THE INVENTION

The invention relates to a system and method of facilitating secure intellectual property transactions.

BACKGROUND OF THE INVENTION

Cooperation between various parties to research and development, including inventors, developers, researchers, scientists, investors, corporations, and others may permit each party to realize significant value over working alone. Multi-party engagements may prove to have even greater value than bilateral engagements. Intellectual property transactions may provide great value to all parties involved.

Hurdles and transaction costs to such cooperation may exist, however. For example, merely identifying potential partners with which to collaborate and/or cooperate may be difficult in an environment where many parties seek to keep their activities private. Furthermore, creating trust between parties, where intellectual property of great value may be contested may be difficult. The global system of patent offices and registries, which includes over 150 different entities may not alleviate these difficulties, as global ownership rights may be difficult to understand because there is no single entity with the ability to verify global ownership rights.

These and other drawbacks exist to current systems of intellectual property development collaboration.

SUMMARY OF THE INVENTION

The invention addressing these and other drawbacks relates generally to a system and method of facilitating intellectual property transactions. Implementations of the disclosure provide means for facilitating intellectual property transactions between various parties, such as investors, inventors, developers, and others.

Implementations of the invention may include a system for managing intellectual property. The system may include a computer system comprising one or more physical processors programmed by computer program instructions that, when executed, cause the computer system to act. The instructions may cause the computer system to receive intellectual property information from a first party, analyze the intellectual property information and store the analysis in an intellectual property database, receive intellectual property criteria from a second party, determine a match between the first party and the second party based on a match between the stored analysis and the intellectual property criteria, record a transaction between the first party and the second party, the transaction including at least one contract term, in a first data block of an intellectual property database, receive, from the first party and the second party, approval of the first data block, perform a secure hashing operation on the first data block to create a first hashed block, and publish the first hashed block to a private ledger.

These and other objects, features, and characteristics of the system and/or method disclosed herein, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of "a", "an", and "the" include plural referents unless the context clearly dictates otherwise.

DETAILED DESCRIPTION OF THE INVENTION

Figure 1:
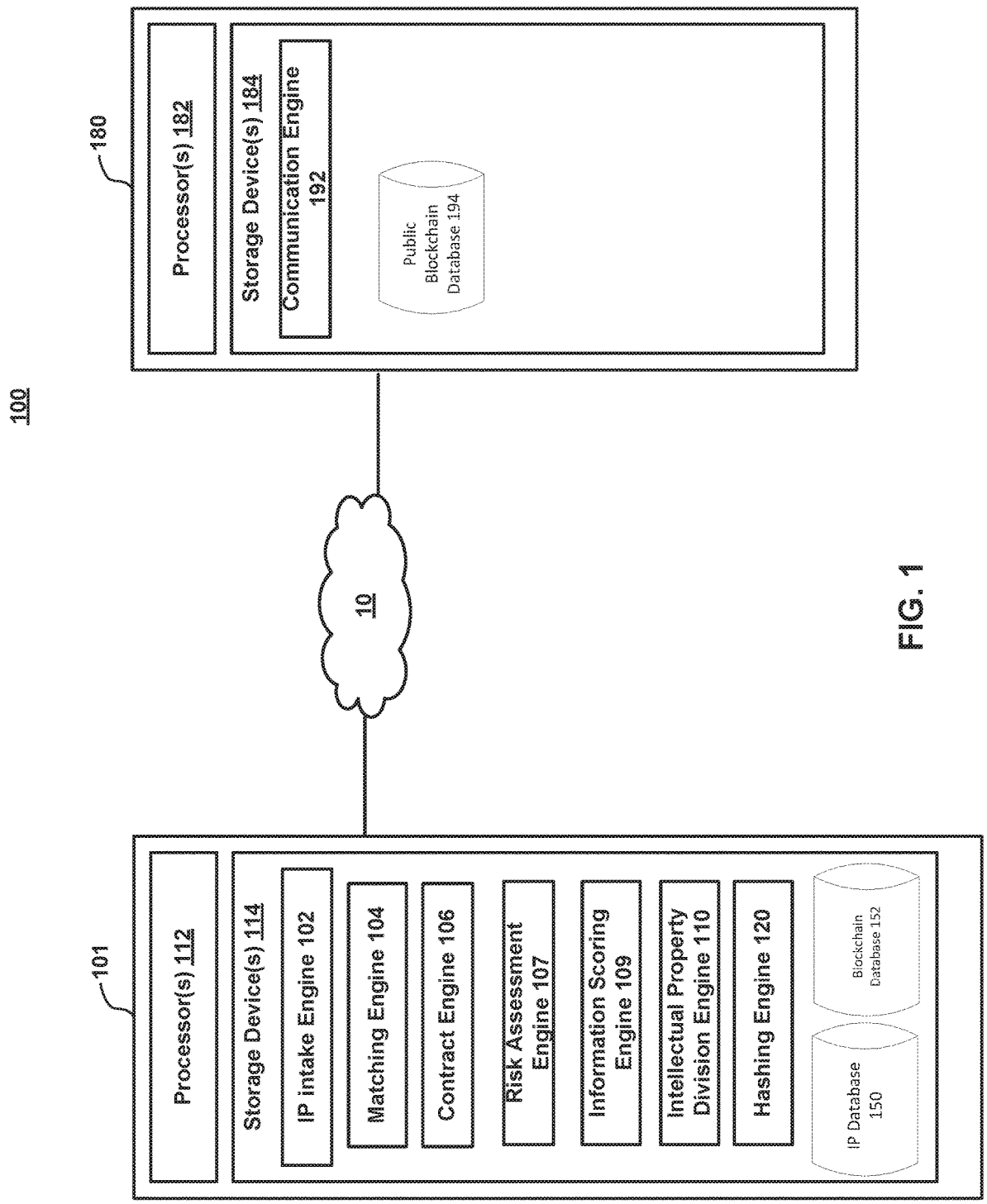
FIG. 1 illustrates an exemplary system for facilitating secure intellectual property transactions.

The invention relates generally to a system and method of facilitating intellectual property transactions. The system may match parties to a potential transaction and facilitate the transaction by providing trust and enforcing contracts between the parties.

Aspects of the present invention include an integrated system that may serve as a virtual IP exchange, investor matching, and verified ledger service. The system may index and match intellectual property parties, such as researchers, developers, intellectual property owners, potential investors, and/or licensees of intellectual property. The system may catalog and track all communication and related transactions and contracts using cryptographically verified blockchain ledger technology.

In one implementation, a neutral third party may host a system that leverages advanced machine learning algorithms to match new inventions and research with potential investors hoping to commercialize the research. Similarly, the system may help to manage the complex relationship of large corporations in collaboration, such as several large pharmaceutical companies collaborating on new drug development. The system may assist the parties in negotiating contract terms. The system may then track all related communication, contracts, revenue, intellectual property asset management events, and transfers through a verified blockchain electronic ledger. As well, the neutral third party may hold the ledger party keys for collateral and safekeeping as part of smart contract enforcement. Blockchain smart contract research and development collaboration auditing and resulting intellectual property escrow may enable parties who may not fully know or trust each other to engage in research and development collaboration with a sense of security and protection in the rare case the collaboration results in conflict. Further, blockchain technology may enable anonymity in collaboration, asset management, and transactions.

In some implementations, the system may serve to facilitate secure bilateral and multilateral intellectual property transactions. Under typical business conditions, it may be difficult for potential intellectual property parties to an intellectual property transaction to develop trust for one another. Intellectual property parties, as used herein, may refer to any two or more entities, individuals, corporations, etc., that may wish to engage in secure transactions involving intellectual property, including patents, copyrights, trademarks, trade secrets, and any other forms of intellectual property.

For example, two competing corporations, such as pharmaceutical corporations, who have traditionally been rivals, may decide to experiment with a collaborative effort to pursue a new and risky market segment. They each are investing substantial sums of money in the partnership and bring established intellectual property assets with them. The corporations may not fully trust each other and may desire a neutral third party partner and system to manage the risk associated with this new venture.

In another example, several leading university research labs may wish to collaborate on a multi-year, large scale research project. Each university team may bring substantial expertise to the partnership and may wish to ensure that any original research coming out of the project is validated as associated with one lab or another. In the past, these labs may have been disappointed when relying on the academic honor system to share credit for scientific breakthroughs. The university teams may desire a system that can accurately verify each party's contribution.

In still another example, a scientist may have promising results from a novel new experiment in her lab. She may wish to exploit the commercial potential to her research and determine if there is investment interest from a commercial partner. She may work at a small college that does not have a reputation for licensing intellectual property, and thus needs help getting her work noticed by potentially interested investors.

In yet another example, a major Japanese electronics manufacturer may hope to substantially expand into innovative new technologies that push the boundaries of consumer technology. The manufacturer may have a long view and wish to invest in promising, early experiments being performed in labs. While they are aware of the big players, they seek a tool or service that can help them find interesting new technologies coming from a wide range of universities and laboratories.

In another example, an investment analyst may be looking for the next big technology for his client to invest in. He may be willing to take a risk for a potentially large reward and may require a system to help focus on promising new technologies, patents, and/or research that his client might purchase and then license to others.

In still another example, a startup technology company may be developing new technologies in a rapidly-developing area of technology. They may wish to get the full value for their developing intellectual property, which may be in the form of trade secrets or in the early stages of patenting. In negotiations with potential investors they must disclose their trade secrets but still desire reassurance that their secrets will be maintained. They cannot afford a significant legal battle, but desire a system that will rigorously verify the details of their intellectual property should a dispute later arise.

These and other examples exist of potential intellectual property parties to transactions that may seek a system for identifying and facilitating secure transactions with other intellectual property parties. Implementations of the present disclosure provide several aspects of a comprehensive secure intellectual property transaction system.

In some implementations, aspects of the present disclosure provide systems and processes for matching two or more intellectual property parties. For example, inventors seeking investors for a partnership, R&D teams seeking other teams for collaborative purposes, and investors seeking opportunities to invest their funds may each use the system to find a prospective intellectual property partner. In some implementations, parties may seek more than one match in the hopes of facilitating a multilateral deal. Systems consistent with the present disclosure may receive information from participating parties and analyze that information to facilitate the matching aspects of the system. Analyzed information may be sorted and codified to develop an intellectual property profile of participating parties.

FIG. 1 illustrates a system 100 for facilitating and securing intellectual property transactions. System 100 may include a private side computer system 101 and a public side computer server 180.

Private side computer system 101 and public side computer system 180 may be any computing device configurable to run software. For example, these computer systems may comprise, without limitation, a server (e.g., having one or more server blades, processors, etc.), a gaming console, a handheld gaming device, a personal computer (e.g., a desktop computer, a laptop computer, etc.), a smartphone, a tablet computing device, and/or other device that can be programmed to receive intellectual property information and. In some implementations, private side computer system 101 may be configured for location in proximity to or even as a component of public side computer system 180. That is, private side computer system 101 and public side computer system 180 may be, in fact, the same computer system. Some implementations may include more than one of each private side computer system 101 and public side computer system 180. A person of skill in the art will recognize that various features and functions of the disclosed intellectual property transaction system may be performed at different locations without departing from this disclosure. Although specific examples of an intellectual property transaction system 100 are provided herein, the disclosure and the invention are not thusly limited.

Private side computer system 101 may include one or more processors 112 (also interchangeably referred to herein as processors 112, processor(s) 112, or processor 112 for convenience), one or more storage devices 114 (which may an intellectual property intake engine 102, a matching engine 104, a contract engine 106, a risk assessment engine 107, an information scoring engine 109, an intellectual property division engine 110, and a hashing engine 120), and/or other components. Processors 112 may be programmed by one or more computer program instructions. For example, processors 112 may be programmed by instructions included in intellectual property intake engine 102, a matching engine 104, a contract engine 106, and a hashing engine 120, as well as other components and/or other instructions. As used herein, for convenience, the various engines may be described as performing an operation, when, in fact, the various instructions of these engines program the processors 112 (and therefore private side computer system 101) to perform the operation.

Intake engine 102 may include instructions that program private side computer system 101. The instructions of intake engine 102 may include, without limitation, instructions for performing intake and analysis of intellectual property information, and/or other instructions that program computer system 101 to perform various operations, each of which are described in greater detail herein. Intake engine 102 may cause processor 112 to intake and analyze intellectual property information provided by users of the system.

Intellectual property information may include, for example research and development information about intellectual property parties, mergers and acquisitions information, financial market indicators, grant funding data, scientific papers and reports, technical drawings and specifications all to inform recommendations of matches between intellectual property parties.

Intellectual property information may include, for example, research and development focus areas of participating intellectual property parties. Intellectual property information may include, for example, information about patents in a party's R&D focus area, such as historical patent application filing information, patent strength information, technical terms and formulas obtained from a party's patents and patent applications obtained via text mining, information about the classifications of patents and patent applications of a party, and any combination thereof. Intellectual property information may further include any of the above described patent information falling outside of a party's R&D focus area.

Intellectual property information may further include published scientific papers and reports in a party's R&D focus area or areas. Scientific papers and reports may be scored, for example, by strength metrics (e.g., based on citation numbers), new technical terms, and/or formulas.

Intellectual property information may further include measures of historic ability to successfully collaborate in R&D ventures. Such ability may be measured, for example, by past patents of party showing joint filing and/or assignee ownership with other parties which it does not legally own, litigation and/or opposition relating to collaboration, past scientific articles showing joint publication and/or assignee ownership with other parties which it does not legally own, and abandoned past R&D collaboration agreements. Legal proceedings with respect to and abandonments of collaboration agreements may negatively impact metrics related to intellectual property information. Historic ability to successfully collaborate in R&D ventures may further be obtained from interactions with the IP transaction facilitation system described herein.

Intellectual property information may additionally include contribution information about intellectual property that a party is proposing to contribute to a potential collaboration. Such contribution information may include, for example, information about patents to be included in a collaboration, including the patents involved, the method of contribution, e.g., licensing, transfer to a multi-party research entity, and others. Contribution information may further include information about proprietary data, proprietary designs, trade secrets, and other non-patent intellectual property information.

Intellectual property information may additionally include expectation information about intellectual property returns that a party is expecting as a result of a potential collaboration. For example, such expectation information may include information about licensing, multi-party intellectual property ownership and percentages of intellectual property right ownership, royalty and/or revenue expectations (both absolute and percentage based), rights in future, derivative patent filings.

Intellectual property information may further include information about existing R&D funding, e.g. from grants and/or investors. Such information may be derived from a party's volunteering the information and/or from public sources, such as SEC filings, and academic and Government Public Funding Disclosures.

Intellectual property information may further include information about proprietary data that a party owns and/or has access to.

Intellectual property information may include information about a party's intellectual property assets (i.e., patent holdings), capabilities (e.g., as understood from scientific papers), resources (e.g., access to funding and/or capital), and/or needs and desires (i.e., what they are seeking in collaboration).

Intake engine 102 may be programmed to receive intellectual property criteria from system users. Intellectual property criteria may include characteristics that an intellectual property party is seeking in a potential transaction partner. For example, a technology start-up may be seeking a well-funded partner that is willing to take risks. Providers of capital may seek riskier, higher upside or stabler, lower upside investments, depending on their investment goals. Intellectual property criteria may specify any or all of the above described aspects of intellectual property information as sought-after characteristics in an intellectual property partner.

Intake engine 102 may be programmed to receive intellectual property information and intellectual property criteria from system users, i.e., intellectual property parties, as soon as they begin using the system. An intellectual property party may begin inputting intellectual property information, which may be used to build an intellectual property profile, prior to any matching with potential intellectual property partners. The inputted intellectual property information may therefore serve to assist in matching with potential intellectual property partners.

Intake engine 102 may be programmed to classify and/or score any or all received intellectual property information. Information may be classified by technological area, by score, and/or by type of intellectual property (e.g., proprietary data vs patents and patent applications). Intake engine 102 may employ information scoring engine 109, discussed in greater detail below, to score received intellectual property information.

Intake engine 102 may be programmed to determine an intellectual property profile of each intellectual property party, based on their intellectual property information and their intellectual property criteria. Intellectual property information may include, for example, information about a party's assets and capabilities, and a party's technological focus area. Further information aspects of a party's intellectual property profile may further include the outputs of risk assessment engine 107 and information scoring engine 109. Criteria aspects of a party's intellectual property profile may include, as described above, information about a party's intellectual property needs, such as resources for funding, or technologies to invest in.

Matching engine 104 may include instructions for programming processor 112. The instructions of matching engine 104 may include, without limitation, instructions for matching intellectual property parties with other intellectual property parties. As used herein, intellectual property parties may be any entities that engage with the system and provide intellectual property information. The instructions of matching engine 104 may include, without limitation, instructions for updating a profile database, and/or other instructions that program private side computer system 101 to perform various operations, each of which are described in greater detail herein.

Matching engine 104 may match intellectual property parties based on the intellectual property profiles of the involved parties, e.g., by intellectual property information disclosed by each party, including, for example, assets, capabilities, and needs. For example, a party with high levels of assets and capabilities in a particular technological area may be matched with a party with high levels of resources in that technological area.

Matching engine 104 may use supervised machine learning via a naïve Bayesian classifier based rules-engine to continuously learn and improve over time the optimal inclusion and/or weightings of the above mentioned attributes and/or other characteristics of the parties to predict successful R&D collaboration among parties. Matching engine 104 may use an R&D collaboration learning set. The R&D collaboration learning set may include, for example, successful and unsuccessful past R&D collaboration used in the system as well as publicly available multiparty filed patents, published journals, and transfer of IP assets from global patent office patent publications, grants, register, and legal status information.

Measures of successful/unsuccessful R&D collaboration may include some or all of annual patent fee payments, global patent filing breadth, litigation records, citations, derivative patent applications (e.g., continuation, divisional, and/or continuation-in-part), licensing information mergers and acquisition activity, and investment activity.

Matching engine 104 may use regression based analysis to continuously learn and improve over time the optimal and/or weightings of the above mentioned attributes and/or other characteristics of the parties to predict successful R&D collaboration among parties.

Matching engine 104 may further predict potential results of multiparty R&D collaborations, including, for example, projected annual patent fee payments, projections of global patent filing breadth, length of projected IP protection, projections of potential deal valuations for different types of eventual deals (M&A, divestiture, or etc.) and related timelines.

Matching engine 104 may use various public and private information to perform matching. Public information may include all types of publically available information. Private information may include information entered by parties, as well as information collected by the system over time. Such public and private information may include, for example, information past transactions, e.g., mergers and acquisitions, divestitures, IPOs, private equity investments, etc.

Matching engine 104 may use various public and private information sources to perform the above described predictions and projections, including, for example, measures of stock performance, measures of global patent fee payments per patent per portfolio, measures of R&D funding budgets, measures of R&D licensing revenues (e.g., as determined from United States SEC Filings and global equivalent regulatory documents), measures of patents used as loan collateral (e.g., as determined by available patent assignment information.)

Matching engine 104 may employ any and all of the above described metrics and information to perform party matching. Party matching may, for example, match investors to promising trending valuation technologies developed by intellectual property parties best identified for success based on machine learning techniques as described above.

In some implementations, matching engine 104 may use intellectual property criteria inputted by a party to perform matching. Matching thus performed may be more manually controlled, as a system user may actively seek specific characteristics in a partner, rather than permitting matching engine 104 to perform the matching based on machine learned matching models. In some implementations, matching engine 104 may use a hybrid matching model, permitting users to specify some intellectual property criteria to match on a manual basis while using machine learning models to match other aspects.

Contract engine 106 may include instructions for programming processor 112. The instructions of contract engine 106 may include, without limitation, instructions for preparing, executing, and enforcing smart contracts between intellectual property parties. The instructions of contract engine 106 may include, without limitation, instructions for updating a profile database, and/or other instructions that program private side computer system 101 to perform various operations, each of which are described in greater detail herein.

Contract engine 106 may program processor 112 to build electronically enforceable contracts. In some implementations, contract engine 106 may suggest to involved intellectual property parties contract terms based on assessments of intellectual property information and risks. For example, the system may recommend and draft smart contract terms such that investors taking on more risk would be entitled to higher rewards resulting from the R&D investment.

Contract engine 106 may be configured to suggest and enforce terms of an intellectual property contract. Contract engine 106 may be configured to suggest terms for multiple intellectual property parties, and may thus significantly reduce the time and expense otherwise required in the negotiation of such a contract.

Contract engine 106 may be configured to develop a contracting model through machine learning techniques, suggest contract terms based on the contracting model, electronically enforce contract terms, and revise and update the contracting model based on contracting results of parties within the system.

Contract engine 106 may be configured to develop a contracting model. Contract engine 106 may user machine learning techniques to develop contract building models that may then be applied to a potential transaction to produce suggested contract terms. Contract building models may be built from stored contract data. Contract data may include publicly available contract data, e.g., through patent assignment databases, and privately compiled contract data, e.g., data collected by the system over time as well as proprietary data compiled by various firms and integrated into the system. Contract data may include information about parties involved in intellectual property transactions, information about contract terms, information about assets subject to the intellectual property terms, and information about results of the intellectual property transaction or contract. Information about the parties involved may include all of the types of information discussed herein with respect to intellectual property parties. Information about the assets may include all of the types of information discussed herein with respect to intellectual property assets and their values. Information about contract terms may include information about licensure terms, royalty rates, fees, costs, warranties, breach penalties, contract length, and any other relevant contract terms. Information about results may include information about resulting patents, resulting products, length of collaboration, information about financial success after the transaction, and any other additional resulting information. Information about results may further include information regarding whether contract terms were kept, whether contracts were breached, and whether there was subsequent litigation.

Contract engine 106 may use contract data history to build a contracting model, including correlations between contract terms of successful intellectual property transactions (as measured by results discussed above) as well as correlations between contract terms and characteristics of the involved intellectual property parties.

Contract engine 106 may be configured to suggest contract terms of an intellectual property contract between one or more parties. For example, contract engine 106 may be configured to suggest terms of an intellectual property license, e.g., limitations, warranties, rates, length of the license, based on terms from previous contracts that led to successful outcomes. Thus, contract engine 106 may suggest a royalty rate based on determined information about the value of the intellectual property and the financial condition of the involved intellectual property parties. The suggested royalty rate may take into account previous royalty rates between comparable intellectual property parties, and may place more weight on previous royalty rates from successful intellectual property contracts. Thus, a start-up company with little experience in negotiating intellectual property transactions, may use contract engine 106 to develop initial contract terms from which to negotiate. In some implementations, contract engine 106 may be configured to determine and suggest contract terms that create the largest total value between two or more intellectual property parties.

In some implementations, contract engine 106 may access legal databases when suggesting contract terms. Such legal databases may be jurisdiction specific. For example, contract law may vary between countries and between different jurisdictions in the same country (i.e., different U.S. states enforce contracts differently). In some implementations, contract engine 106 may be configured to suggest contract terms stating a law meant to be applied to the contract. In some implementations, contract engine 106 may be configured to consider jurisdiction specific laws when determining suggested contract terms. Because different jurisdictions may interpret contract terms differently, contract engine 106 may thus suggest different contract terms depending on a jurisdiction in which the contract is intended to be enforced. In some implementations, contract engine 106 may be configured to alert users to contract terms that may conflict with the laws other jurisdictions. For example, where intellectual property parties are contracting to license an import restricted technology, contract engine 106 may identify countries to which import is restricted and suggest contract terms accordingly. Contract engine 106 may be configured to alert authorities to situations where intellectual property parties manually override safeguards against prohibited technology uses.

Contract engine 106 may be configured to facilitate the enforcement of contract terms. For example, in some implementations, contract engine 106 may be configured to notify involved intellectual property parties that contractual obligations, such as royalty payments, are due.

In some implementations, contract engine 106 may provide automatic enforcement of contractual obligations. For example, contract engine 106 may permit parties to provide proof that a contract term has been met, for example, by adding funds transfer records to data to be recorded to the private ledger. Upon fulfillment of contract terms, e.g., via the presentation of deliverable items, contract engine 106 may automatically trigger the enforcement of other contract terms, e.g., the payment of escrowed funds.

In some implementations, contract engine 106 may manage IP assets held in escrow. For example, parties to a contract within the system may agree to escrow various IP assets during the terms of a deal. These assets may include, for example, software code, laboratory data, design information, etc. Contract engine 106 may be configured to automatically enforce escrow terms and decide to release escrowed items upon the fulfillment of various conditions.

Contract engine 106 may be configured to alert intellectual property parties to potential contractual problems, such as contract breach or other failure to meet contractual obligations by one or more involved intellectual property party. In some implementations, contract engine 106 may access legal databases, including jurisdiction specific legal databases, in making such alerts and warnings.

Contract engine 106 may be configured to assist in the enforcement of contract terms by traversing the private/public ledger audit trail. For example, where an involved intellectual property party disputes an aspect of an intellectual property transaction, contract engine 106 may be used to verify original contract terms and/or data. Such verification may involve contract engine 106 operating to display a verified correspondence between hashed blocks of the private ledger and public ledgers and un-hashed contract terms and data. That is, contract engine 106 may return to the original un-hashed contract terms and data requiring verification and employ hashing engine 120 to perform a hashing operation on them. The results of the hashing operation may be compared to the private ledger and/or the public ledger to verify the original data. In some implementations, verification may involve contract engine 106 operating to reverse a hash function. That is, contract engine 106 may employ hashing engine 120 to undo a hashed block to reproduce the contract terms and data that were used to produce the hashed block. Contract engine 106 may be configured to unhash all of or a portion of the public ledge and/or the private ledger to verify the underlying data.

Contract engine 106 may be configured to update the contracting model based on contracting results. In some implementations, contract engine 106 may frequently update a contracting model based on the results of intellectual property transactions facilitated by and recorded within the intellectual property transaction facilitation system described herein.

Risk assessment engine 107 may include instructions for programming processor 112. The instructions of risk assessment engine 107 may include, without limitation, instructions for assessing various risk related aspects of a potential IP collaboration. The instructions of risk assessment engine 107 may include, without limitation, instructions for updating a profile database, and/or other instructions that program private side computer system 101 to perform various operations, each of which are described in greater detail herein.

Risk assessment engine 107 may determine risk scores for all parties to potential intellectual property transactions. For example, an inventor seeking investment funds may wish to understand the risks associated with a potential investor, such as that investor running out of funds. In another example, an investor may wish to understand risks associated with a certain technical field.

Risk assessment engine 107 may assess collaboration risk based on macro risk factors, such as R&D technology focus areas and micro risk factors, such as specific parties to a potential collaboration. Risk assessment engine 107 may base risk factor calculations on publicly available data, such as financial information as well as private data, such as an intellectual property profile, as described above.

Risk assessment engine 107 may use a "random forest," e.g., ensemble rules/regression based machine learning, to determine and continuously learn and improve over time the optimal inclusion and/or weightings of the macro and micro risk factors and/or other characteristics of the parties to determine risk scores for intellectual property parties.

Risk assessment engine 107 may use macro risk factors such as R&D collaboration behavior risk, intellectual property protection risk, research risk, commercialization risk, financial risk, and litigation risk. Each of the risk factors discussed herein may be normalized by comparison to peer group, sector, and/or overall R&D technology risk.

R&D collaboration behavior risk may include past R&D Collaboration behavior recorded by the secure transaction system by all R&D multiparty contracts collaborating in the same or adjacent specific technology area. Technologies may be defined, e.g., by text-mining technology phrases in journal and/or patent documents and/or classifications clusters. Adjacent technologies may be identified by nearest neighbors clustering of patent classification(s) clusters that define a technology in global patent databases of documents and/or nearest neighbors of text phrases in global patent databases of documents that define a technology. In R&D Technology areas where R&D collaboration in the system has been demonstrated to be more difficult, for example, a higher risk may associated.

Intellectual property protection risks may include risks related to obtaining legal intellectual property protections in a given technology area as well as risks related to existing patents that may be part of a proposed collaboration. Such risks may include, for example, time to patent grant associated with a technology area. Technology areas with greater times to grant may indicate greater risk. Lag times may be normalized to eliminate office delays and examiner delays unrelated to specific technology areas. Intellectual property risk assessment may take into account derivative patent filings. For example, technological areas with fewer derivative patent filings may indicate a risk that a technology area will not lead to further innovation. Intellectual property risks may include patent application to grant ratios, which may indicate a difficulty in obtaining patent grants. Intellectual property risks may include examiner search report quality in the technology area. Intellectual property risks may include overall levels, as well as increasing and decreasing rates of patent filing activity in a technological area. High levels of activity, as well as increasing or decreasing rates may indicate higher levels of risk. Intellectual property risks may include patent classification breadth. For example, R&D technologies that span fewer than normalized patent classifications may have more risk because claim coverage may be narrower and/or because such applications may be less innovative than technologies that cover more broad patent classifications. Intellectual property risks may include the number of independent claims in patents and patent applications, as patents with a higher number of independent claims may have a higher tendency towards patent strength. Intellectual property risks may include forward patent citations. R&D technologies with fewer than normal citations, including, but not limited to, decreasing over time, may be a risk to the investor.

Research risks may include risks and assessments related to common research forums, such as journal publication activity, journal citation activity, and reputational information about academic and government institutions involved in the research areas that are subjects of potential transactions.

Commercialization risks may include risks related to commercialization of technologies. Commercialization risks may include, for example, market valuation and size metrics. Such metrics may include regression based analysis based on at least stock valuations, patent maintenance fee payments, R&D funding, R&D licensing revenue, deal valuations (venture capital, private equity, M&A, divestitures, IPOs, subsidiary activity, etc.). Regression based analysis including such factors may be performed based on machine learning techniques that compare these factors to collaborational outcomes. Commercialization risks may include, for example, geographic breadth of patent filings, as narrower filings may indicate increased risk, and global fee payment activity, as failure to maintain fee payments may indicate increased risks. Commercialization risks may further include ratios of small/medium enterprise to larger enterprise involvement in the technology area, as this ration may indicate different risks according to the lifecycle of the technology. That is, in early stages of a technology lifecycle, it may be desirable to have a higher ratio, indicating the involvement of fewer large enterprises, whereas, at a mature stage of a technology lifecycle, a lower ration may be preferred. Commercialization risks may further include measures of patent transfer activity, venture capital to private equity activity, M&A activity, and licensing activity, each of which may represent different levels of risk depending on timing of the activity with respect to a technology lifecycle. Commercialization risks may include utility model to patent application filing ratios in the technology area, utility model to patent application transfer rate, patent filing abandonment rate, and/or technology obsoletion rate. High obsoletion rate technologies, such as, for example, certain smart phone technologies, become obsolete prior to their full possible IP protection term (i.e. 20 years). Technologies having a higher than normalized "obsoletion rate" and/or patent filing process abandonment rate may be a greater risk to the investor as they may have less time to recover their investment. Obsoletion rates and abandonment rates may be measured, for example, by patent filing applications that have started the filing process, but are abandoned before grant, the time at which patent maintenance fee payments are discontinued, and legal status events indicating a reduction of designated states in a WIPO and/or Regional Patent Filing procedure (EP, ARIPO, etc.).

Financial risks may include finance related risks to any party of a potential intellectual property transaction. For example, financial risks may include normalized loan collateral rates, bankruptcy filing rates, and stock market forecasts. Higher than normal loan collateral rates and bankruptcy rates may indicate a technology field under greater financial stress. Technology areas experiencing stock market declines may also indicate greater degrees of risk.

Litigation risks may include rates and success of patent litigation actions in a particular technology area, as well as trends in these factors. Litigation risks may further include rates of patent invalidation in a particular technology area, as well as trends in this factor.

Micro risk factors may include all of the risk factors described at the macro level, but applied particularly to an individual intellectual property party, rather than a technology field as a whole. Micro risk factors may include additional risk factors. For example, these factors may include R&D collaboration behavior risk, intellectual property portfolio risk, research risk, commercialization risk, executive management effectiveness risk, technology/R&D strategy management effectiveness risk, financial risk, and litigation risk.

Intellectual property scoring engine 109 may include instructions for programming processor 112. The instructions of patent assessment module may include, without limitation, instructions for assessing the intellectual property and patent portfolio strength of an intellectual property party. The instructions of intellectual property scoring engine 109 may include, without limitation, instructions for updating a profile database, and/or other instructions that program private side computer system 101 to perform various operations, each of which are described in greater detail herein. Intellectual property scoring engine 109 may program processor 112 to scan and score intellectual property information collected by intellectual property intake engine 102.

Intellectual property scoring engine 109, may assess patent and patent applications of an intellectual property party. For example, intellectual property scoring engine 109 may score patents and patent applications based on patent strength, age, disruptive patent actions, and other factors. Parameters associated with patent scoring may be normalized per R&D research group (same R&D technology), R&D research peer group (same and adjacent R&D technologies), R&D sector (broader level of R&D technologies, as defined by the journal classification system and/or subclass(es) in patent classification or broader corpus of documents of multiple adjacent technologies), and/or out of all R&D technologies (regardless of sector, as defined by all R&D journals and/or patent classifications(s) and/or a full corpus of text in patent documents). Intellectual property scoring engine 109 may score a patent portfolio based on one or more of patent filing geographic breadth, patent examiner search reports, patent grant rate, patent grant lag, derivative applications, citations, utility model vs. regular filings ratio, fee payments, classification breadth, independent claims, forward citations, loan collateral, transfers, litigation risks, and potential markets. Each of these factors may be weighted based on system information and machine learning comparisons with previously scored and evaluated portfolios.

Intellectual property division engine 110 may include instructions for programming processor 112. The instructions of intellectual property division engine 110 may include, without limitation, instructions for determining rights in a combined intellectual property portfolio to individual contributors of the portfolio. The instructions of intellectual property division engine 110 may include, without limitation, instructions for updating a profile database, and/or other instructions that program private side computer system 101 to perform various operations, each of which are described in greater detail herein.

Intellectual property division engine 110 may determine rights, or suggest a determination of rights, based on initial contributions of intellectual property parties to a proposed intellectual property transaction. For example, intellectual property division engine 110 may determine a suggested allocation of rights based on investment, intellectual property scores determined by scoring engine 109, devoted human resources, proprietary data, and research papers contributed by each party to a transaction. During an agreed upon collaboration, intellectual property division engine 110 may modify a suggested determination of rights based on party contributions to the collaborative project. Monitoring of party contributions may be based on, for example, keystroke logging, document check-in, etc.

Hashing engine 120 may include instructions for programming processor 112. The instructions of hashing engine 120 may include, without limitation, instructions for creating a chain of hashed blocks (block chain). The instructions of hashing engine 120 may include, without limitation, instructions for updating a profile database, and/or other instructions that program private side computer system 101 to perform various operations, each of which are described in greater detail herein.

A block chain may be a chain of securely hashed blocks. Hashing a block of the chain may involve using a cryptographic hash function on a data block to produce a hashed block. A chain may be formed by including most recently hashed block with the data block when the newest hashed block is created. A suitable cryptographic hash function may be a function such that the original data block cannot be reconstructed from the hashed block. However, the hashed block may be used to verify that the data block has not been altered or otherwise tampered with. A data block that has been altered will provide a different hash value when subject to the same cryptographic hash function as the original data block. Comparison of hashed blocks can demonstrate whether or not the underlying data has been altered. Because each data block may include all or a portion of the previous hashed block, a secure and verifiable chain of hashed blocks may be created. The first block in a chain of hashed blocks may be referred to as a genesis block, and a chain of hashed blocks may be referred to as a ledger. The hashed blocks may be used to verify the underlying data without revealing the underlying data.

Hashing engine 120 may include instructions for programming processor 112 to create a chain of hashed blocks from data collected by components of the intellectual property secure transaction system 100. Hashing engine 120 may create a genesis block for each intellectual property party, including intellectual property information supplied by the intellectual property party. Hashing engine 120 may create genesis blocks for every system user after intellectual property information is supplied. Hashing engine 120 may be configured to periodically update a party's securely hashed genesis block as additional information is input by the party. Thus, any or every user of the system, e.g., intellectual property parties, may have their intellectual property profile securely hashed as a genesis block prior to engaging in any intellectual property transactions.

In this fashion, each party has a verifiable and trustworthy record of their intellectual property ownership prior to engaging in any transactions. Because this verifiable record consists of a securely hashed genesis block, a party may be free to permit a transaction counter-party access to the hashed genesis block when an intellectual property transaction occurs. For example, if two pharmaceutical companies engage in a collaborative effort, the agreement may stipulate that each party to the collaboration contribute certain intellectual property information to the collaboration effort. The contributed information may be only a subset of the information contained in each company's intellectual property information. If the collaboration yields new discoveries, any claim by one of the collaboration parties that the discovery had been previously made may be verified through that party's securely hashed genesis block. Because each party's genesis block represents an independently verifiable record of that party's intellectual property ownership prior to collaboration, trust between the parties may be increased.

When two or more intellectual property parties enter into a transaction, hashing engine 120 may create a chain of blocks to create a verifiable audit trail of all actions related to the transaction. A first securely hashed block in the transaction block chain may include at least portions of the genesis blocks of each involved party, as well as information related to the transaction. As the collaboration continues, new information and data related to the collaboration may be hashed into additional blocks to maintain a verifiable trail of information. Because altering the data underlying any point of the ledger would require alteration of all subsequent portions of the ledger, such alteration necessarily creates a false ledger.

Hashing engine 120 may include instructions to receive approval from all involved parties prior to creating a hashed block from a data block. For example, where two parties have come to an agreement to enter into a transaction, a first data block may include the hashed genesis block of each party, information detailing the terms of the transactions, and any data that the two parties are contributing to the collaboration. Prior to hashing the first data block into a first hashed block, hashing engine 120 may require approval of the to be hashed data from both parties. After approval, hashing engine 120 may then create a securely hashed block. As new data is incorporated into a collaborative effort, new hashed blocks may be periodically created to form a ledger. The creation of each new hashed block may require hashing engine 120 to receive approval from all parties.

Hashing engine 120 may include instructions for the creation of private and public ledgers. For example, two parties to an intellectual property transaction may have their data hashed to a ledger as described above. This ledger may be a private or a public ledger. Parties may prefer a private ledger because, although data that has been run through a cryptographic hash function may be difficult to reconstruct, it may not be impossible. In the case of a private ledger, each party to a transaction, as well as a neutral third party facilitator may have access to the private ledger. Parties may prefer a publicly available ledger to prevent one party from altering underlying data to produce a false version of the private ledger. A publicly available ledger, available and known to entities outside of the collaboration, may prevent one party to the collaboration from attempting to claim that a false ledger is the actual ledger.

Hashing engine 120 may include instructions for the creation of a dual ledger system, including private and public ledgers. In such a system, transaction and collaboration data may be hashed to a private ledger, available only to parties to the transaction and selected neutral third parties. Hashing engine 120 may then, based on internal logic and/or approval of all parties, create a public ledger consisting of hashed portions of the private ledger. Because each block of the public ledger includes only a portion of each hashed block of the private ledger, it may not be possible to reconstruct any underlying data. However, because the public ledger may be duplicated in many places, it may be used to verify the integrity of the private ledger, and, therefore, the underlying collaboration data. A public ledger may be stored on a computer system, such as a server, that is accessible to the public.

Intellectual property database 150 may be configured to store intellectual property information and other information related to intellectual property parties as collected by intellectual property intake engine 102.

Block chain database 152 may be configured to store hashed block chain data as created by hashing engine 120. For example, block chain database 152 may be configured to store a private ledger included securely hashed blocks of intellectual property information.

Public side computer system 182 may include one or more processors 182 (also interchangeably referred to herein as processors 182, processor(s) 182, or processor 182 for convenience), one or more storage devices 184 (which may include communications engine 192 and public block chain database 194), and/or other components. Processors 182 may be programmed by one or more computer program instructions. For example, processors 182 may be programmed by instructions included in communications engine 186, as well as other components and/or other instructions. As used herein, for convenience, the various engines may be described as performing an operation, when, in fact, the various instructions of these engines program the processors 112 (and therefore public side computer system 182) to perform the operation.

Communications engine 192 may include instructions for programming processor 182. The instructions of communications engine 192 may include, without limitation, instructions for communicating with private side computer system 101 and other computer systems. The instructions of communications engine 192 may include, without limitation, instructions for communicating with private side computer system 101 and other computer systems, and/or other instructions that program public side computer system 180 to perform various operations, each of which are described in greater detail herein. Communications engine 192 may communicate with private side computer system 101, for example, over a network 10. Network 10 may include any type of communications network capable of transmitting data between two parties, for example, the Internet, a WAN, a LAN, etc.

Public block chain database 194 may be configured to stored hashed block chain data. For example, public block chain database 194 may be configured to store a public ledger including securely hashed blocks of intellectual property information.

Communications engine 192 may be configured to receive data from private side computer system 101. For example, communications engine 192 may include instructions permitting public side computer system 182 to receive public ledger information from private side computer system 101. Communications engine 192 may further include instructions to permit access to the public ledger information from other computer systems.

Although illustrated in FIG. 1 as a single component, computer system 100 may include a plurality of individual components (e.g., computer devices) each programmed with at least some of the functions described herein. In this manner, some components of private side computer system 101 and public side computer system 180 may perform some functions while other components may perform other functions, as would be appreciated. The one or more processors 112 may each include one or more physical processors that are programmed by computer program instructions. The various instructions described herein are exemplary only. Other configurations and numbers of instructions may be used, so long as the processor(s) 112 are programmed to perform the functions described herein.

Furthermore, it should be appreciated that although the various instructions are illustrated in FIG. 1 as being co-located within a single processing unit, in implementations in which processor(s) 112 includes multiple processing units, one or more instructions may be executed remotely from the other instructions.

The description of the functionality provided by the different instructions described herein is for illustrative purposes, and is not intended to be limiting, as any of instructions may provide more or less functionality than is described. For example, one or more of the instructions may be eliminated, and some or all of its functionality may be provided by other ones of the instructions. As another example, processor(s) 112 may be programmed by one or more additional instructions that may perform some or all of the functionality attributed herein to one of the instructions.

The various instructions described herein may be stored in a storage device 114, which may comprise random access memory (RAM), read only memory (ROM), and/or other memory. The storage device may store the computer program instructions (e.g., the aforementioned instructions) to be executed by processor 112 as well as data that may be manipulated by processor 112. The storage device may comprise floppy disks, hard disks, optical disks, tapes, or other storage media for storing computer-executable instructions and/or data.

The various databases, e.g. intellectual property database 150, described herein may be, include, or interface to, for example, an Oracle™ relational database sold commercially by Oracle Corporation. Other databases, such as Informix™, DB2 (Database 2) or other data storage, including file-based, or query formats, platforms, or resources such as OLAP (On Line Analytical Processing), SQL (Structured Query Language), a SAN (storage area network), Microsoft Access™ or others may also be used, incorporated, or accessed. The database may comprise one or more such databases that reside in one or more physical devices and in one or more physical locations. The database may store a plurality of types of data and/or files and associated data or file descriptions, administrative information, or any other data.

The various components illustrated in FIG. 1 may be coupled to at least one other component via a network, which may include any one or more of, for instance, the Internet, an intranet, a PAN (Personal Area Network), a LAN (Local Area Network), a WAN (Wide Area Network), a SAN (Storage Area Network), a MAN (Metropolitan Area Network), a wireless network, a cellular communications network, a Public Switched Telephone Network, and/or other network. In FIG. 1, as well as in other drawing Figures, different numbers of entities than those depicted may be used. Furthermore, according to various implementations, the components described herein may be implemented in hardware and/or software that configure hardware.

Figure 2:
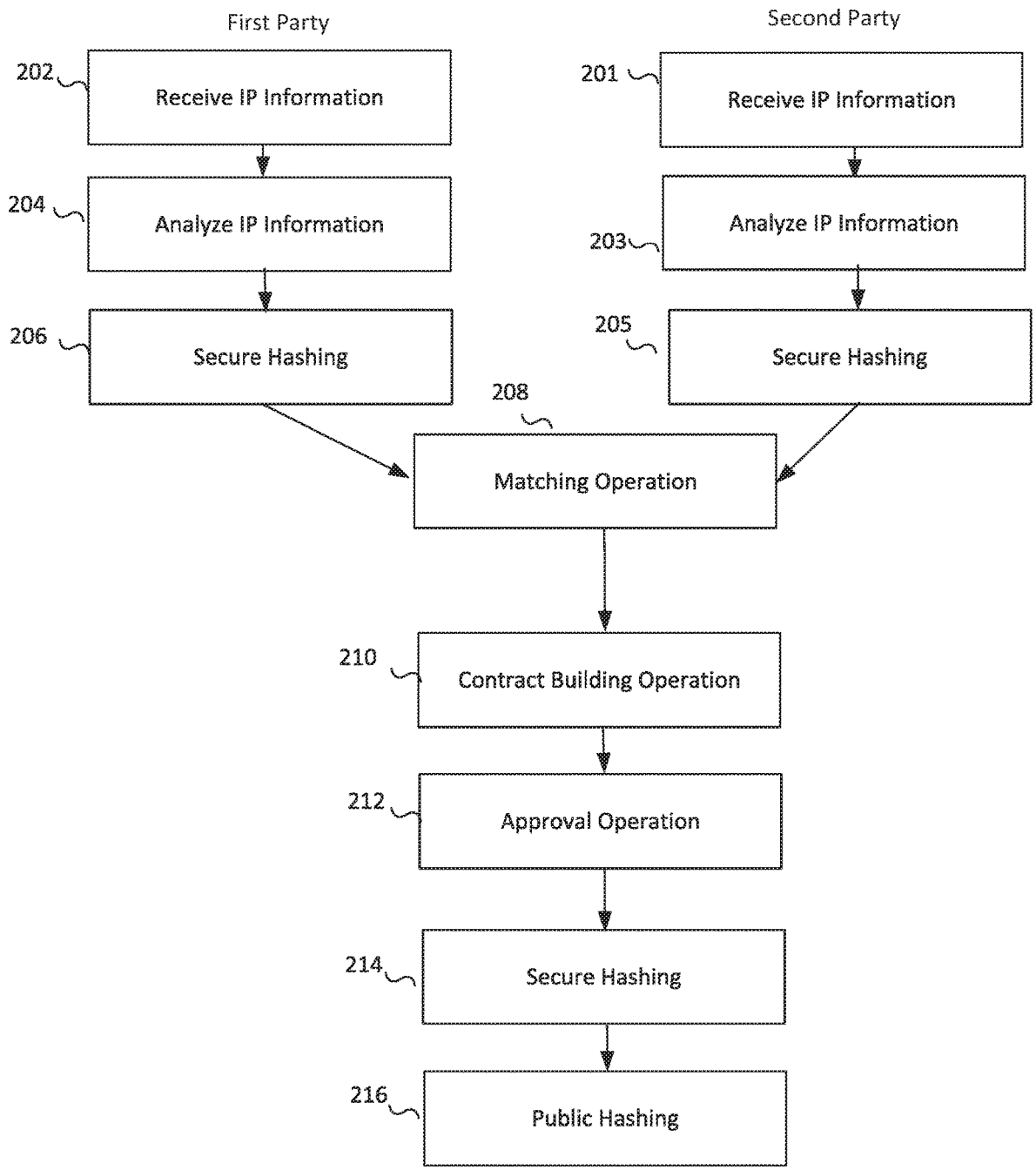
FIG. 2 depicts a process of facilitating a secure intellectual property transaction.

FIG. 2 illustrates an exemplary secured intellectual property transaction process 200 according to some implementations of the present disclosure. The various processing operations and/or data flows depicted in FIG. 2 (and in the other drawing figures) are described in greater detail herein. The described operations may be accomplished using some or all of the system components described in detail above and, in some implementations, various operations may be performed in different sequences and various operations may be omitted. Additional operations may be performed along with some or all of the operations shown in the depicted flow diagrams. One or more operations may be performed simultaneously. Accordingly, the operations as illustrated (and described in greater detail below) are exemplary by nature and, as such, should not be viewed as limiting.

Intellectual property secure transaction process 200 may include an intellectual property reception operation 202. Intellectual property reception operation may be employed to receive intellectual property information from an intellectual property party. Intellectual property reception may be performed by intellectual property intake engine 102.

Intellectual property secure transaction process 200 may include an intellectual property information analysis operation 204. Intellectual property information analysis operation 204 may include the building of an intellectual property profile by intellectual property intake engine 102. As discussed above, an intellectual property profile of a party may include intellectual property information of the party, including assets, resources, capabilities, and technology focus area, as well as risk information developed by risk assessment engine 107 and scoring information developed by information scoring engine 109. Intellectual property profiles may further include intellectual property criteria of a party. Intellectual property profiles may be stored in intellectual property database 150.

Intellectual property secure transaction process 200 may include secure hashing operation 206. Secure hashing operation 206 may include the creation of an intellectual property party genesis block based on the intellectual property profile developed by intellectual property intake engine 102. Each intellectual property party's genesis block may be a block securely hashed from that party's intellectual property profile. Each party's genesis block may be created prior to any transactions with other system users. Should the party enter into a transaction, the state of that party's intellectual property profile at the time the transaction is entered may be preserved. In some implementations, a genesis block for each party may not be created until after a transaction has been agreed upon.

As illustrated in FIG. 2, each of operations 202, 204, and 206 may have analogous operations 201, 203, and 205 operating on intellectual property information of a second intellectual property party. These operations may be duplicated any number of times, permitting intellectual property secure transaction system 100 to develop intellectual property database 150 and block chain database 152. As discussed above, intellectual property database 150 may include intellectual property information from any number of intellectual property parties, i.e., system users, and block chain database 152 may include securely hashed genesis blocks of the intellectual property information of any and/or all users. Furthermore, intellectual property database 150 may be updated at any time that a party enters new intellectual property information that may then be included in a party's intellectual property profile. When new information is entered by a party, operations 202, 204, and 206 may be performed again.

Intellectual property secure transaction process 200 may include a matching operation 208. Matching operation 208 may operate to match two or more intellectual property parties. Matching operation 208 may be performed by matching engine 104 to determine a match between a first party and a second party based at least partly on intellectual property information of one party and intellectual property criteria of the other party. In some implementations, both information and criteria aspects of party intellectual profiles may be used to determine a match. As discussed above, matching engine 104 may use supervised machine learning algorithms to determine matches between parties. As discussed above, all or a portion of a matching process may be manually facilitated through matching engine 104, where one or more of the parties involved in the matching explicitly define characteristics that they seek in an intellectual property partner.

Intellectual property secure transaction process 200 may include a contract building operation 210. Contract building operation 210 may operate to assist intellectual property parties in the negotiation, formation, and drafting of an intellectual property transaction. Contract building operation may employ contract engine 106 to suggest potential contract terms to collaboration parties. Contract engine 106 may make suggestions based on information scores derived from information scoring engine 109, risk assessment scores derived by risk assessment engine 107, and any other intellectual property information and criteria discussed herein. Contract engine 106 may be configured to make valuation and risk assessment suggestion to contract parties. Contract engine 106 may operate to record aspects of the transaction, including all contract terms, to intellectual property database 150. Contract engine 106 may use the results of intellectual property division engine 110, risk assessment engine 107, and information scoring engine 109 to determine contract term suggestions.

During contract building operation 210, contract engine 106 may use the results described above in conjunction with the machine learned contracting model to determine and suggest contract terms for the involved intellectual property parties. Contract engine 106 may suggest and/or create contract terms in a semi-autonomous fashion. That is, contract engine 106 may create terms through the guidance of a system user. Contract engine 106 may suggest contract terms and system users may then adjust, modify, cancel, approve, etc., the suggested terms. In some implementations, contract engine 106 may create or suggest an initial set of terms that parties may then negotiate over. In some implementations contract engine 106 may suggest contract terms for multi-party agreements. In some implementations, contract engine 106 may suggest the entirety of a contract. Contract terms suggested by contract engine 106 may serve to significantly reduce negotiation and transaction costs between parties.

Intellectual property secure transaction process 200 may include an approval operation 212. Approval operation 212 may operate to obtain approval of an intellectual property transaction from one or more involved intellectual property parties. Hashing engine 120 may operate to perform approval operation 212 by obtaining approval of all parties to a hashing operation to be performed. For example, after an intellectual property collaboration has been agreed to by involved parties, hashing engine 120 may obtain approval from the involved parties of the information to be hashed, including, for example, genesis blocks of involved parties, contract terms, and intellectual property information contributions from each party. This information to be hashed may form a data block. Once approval has been obtained, the approved data block may be securely hashed in operation 214.

Intellectual property secure transaction process 200 may include a secure hashing operation 214. Secure hashing operation 214 may be performed by hashing engine 120 on an approved data block. Secure hashing operation 214 may operate to hash the approved data block and publish the hashed block to a private ledger. The private ledger may be accessible only to parties to the intellectual property transaction and to any neutral third parties designated by the involved parties. The private ledger may be stored, for example, in block chain database 152.

Intellectual property secure transaction process 200 may include a public hashing operation 216. Public hashing operation 216 may be performed by hashing engine 120. In some implementations, hashing engine 120 may seek public hashing approval from involved parties. In some implementations, hashing engine 120 may proceed with public hashing operation 216 without first obtaining approval. During public hashing operation 216, hashing engine 120 may securely hash at least a portion of the private ledger to a hashed public ledger block. Hashing engine 120 may communicate, via communications engine 192, with public side computer system 180, to make the hashed public ledger block available for public scrutiny.

Figure 3:
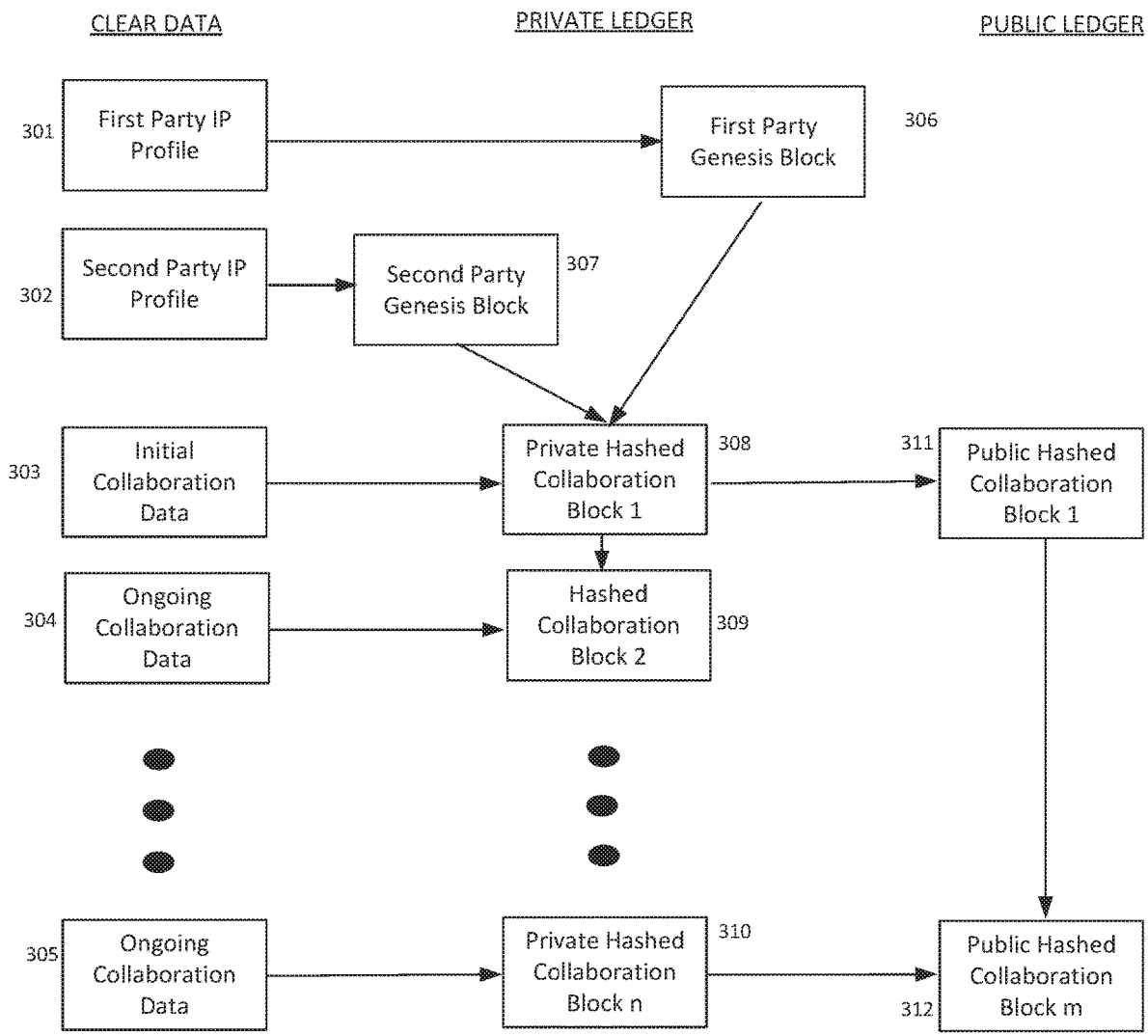
FIG. 3 depicts a schematic demonstrating the use of public and private ledgers consistent with the present disclosure.

FIG. 3 illustrates a pattern of secure hashing to private and public ledgers. Clear data, as illustrated in FIG. 3, may be stored in intellectual property database 150, private ledger information may be stored in block chain database 152, and public ledger information may be stored in public block chain database 194. As illustrated in FIG. 3, an intellectual property profile of a first party 301 and an intellectual property profile of a second party 302 may be securely hashed to a first party genesis block 306 and a second party genesis block 307, respectively. When the parties have agreed to contractual terms and given their approval to hashing engine 120, initial collaboration data 303 (including, e.g., contract information and contributed intellectual property information) may be hashed together with all or portions of genesis blocks 306, 307 to create a first private hashed collaboration block 308. Access to collaboration block 308 may be granted to both the first and second party. In some implementations, access to the respective genesis blocks 306, 307 of first and second parties may be limited to the corresponding party. In some implementations, the creation of genesis blocks 306, 307 may not be required. In some implementations, all or a portion of collaboration block 308 may be securely hashed and published as a first public hashed collaboration block 311.

First private hashed collaboration block 308 may then be used as a basis for creating a second hashed collaboration block 309, with the inclusion of additional collaboration data 304. Additional collaboration data 304 may include test results, white papers, experimental proposals, designs, communications, and any other information pertinent to the collaboration. The private ledger may continue in this fashion, adding additional collaboration data blocks 305 and creating additional hashed collaboration blocks 310. Periodically, all or a portion of additional hashed collaboration block 310 may be securely hashed to form an additional public hashed collaboration block 312. In some implementations, each additional collaboration block 310 may be hashed to form an additional public hashed collaboration block 312. In some implementations, an additional collaboration block 310 may only be hashed to the public ledger periodically, for example, when a research milestone has been reached or a certain number of blocks have been created, or a certain amount of time has passed.

In some implementations, hashing engine 120 may be configured to determine the timing for hashing to a public ledger based on minimum amounts of data required for verifiability. For example, where only a portion of the private ledger is hashed to the public ledger, it may be required that the hashed portion of the private ledger be greater than a certain percentage to guarantee verifiability. Hashing engine 120 may be configured to perform a private to public hashing operation when the new and unhashed blocks of the private ledger reach a size that would pass a threshold in the amount of computing power required to perform the hashing operation.

In some implementations, hashing engine 120 may be configured to determine the timing for hashing to a public ledger based on machine learning techniques. For example, hashing engine 120 may be configured to monitor and build an understanding of the frequency of private to public hashing when manually initiated by involved intellectual property parties. Hashing engine 120 may use this information, or similar information, to suggest hashing to intellectual property parties involved in other transactions.

Figure 4:
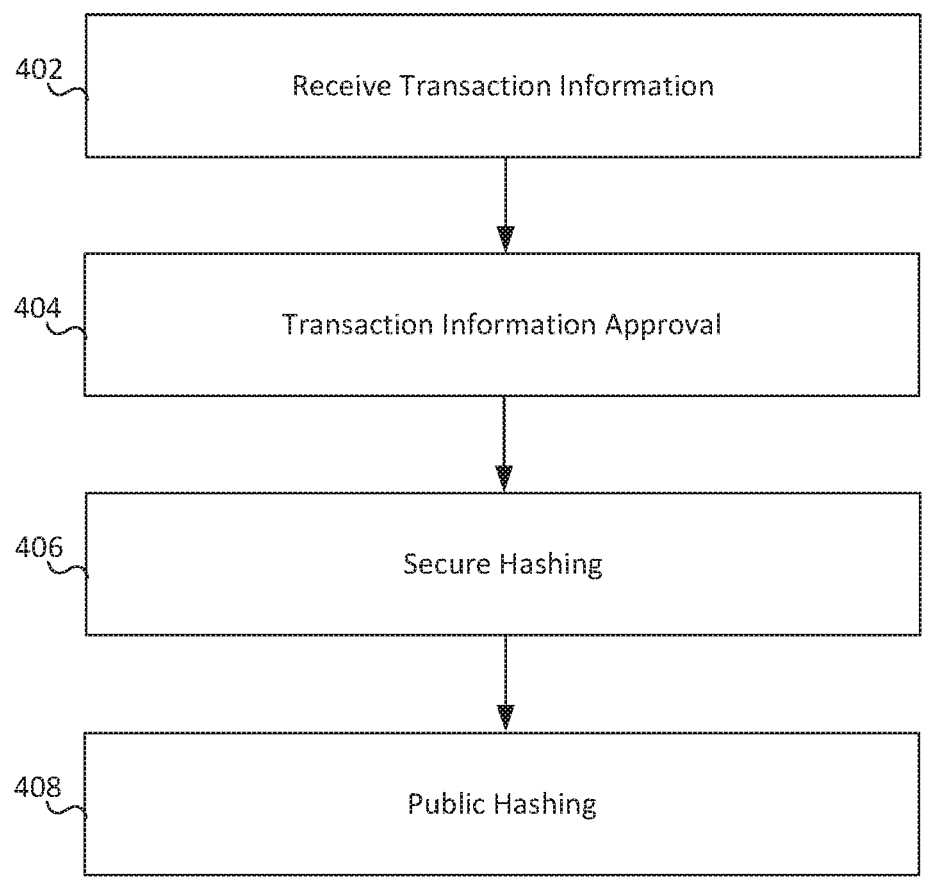
FIG. 4 depicts a process of updating a secured transactions log consistent with the present disclosure.

FIG. 4 depicts a process 400 of updating a private ledger with additional collaboration information. Secure update process 400 may operate to receive and assess additional information, collect additional information into data blocks, and securely hash the information to the collaboration private ledger when approval is received.

Secure update process 400 may include a transaction update reception operation 402. Transaction update reception operation 402 may employ intellectual property intake engine 102 to receive and analyze newly added information. Newly added, ongoing collaboration information, may include new research data, test results, white papers, technical drawings, and all other information related to the ongoing intellectual property collaboration. Ongoing collaboration information may further include financial statements, bank records, invoices, and other documents showing the usage of resources in the intellectual property collaboration. The newly added information may be analyzed by intellectual property intake engine 102 using various capabilities of this engine as previously described. Newly added collaboration information may be codified and prepared as a data block for secure hashing. Transaction update reception process 402 may additionally employ contract engine 106 to determine whether the intellectual property parties are meeting their contractual obligations. For example, contract engine 106 may analyze financial statements and invoices to determine whether an investor collaborator has contributed the agreed upon amount of capital.

Secure update process 400 may include a transaction approval process 404. Hashing engine 120 may be employed to conduct a transaction approval process 404. Once approval has been gained from all involved parties, hashing engine 120 may continue with a secure hashing process 406.

Secure update process 400 may include a secure hashing process 406. Hashing engine 120 may conduct a secure hashing process 406, as described above, to cryptographically hash the data block including the information codified by intellectual property intake engine 102 into a securely hashed block for publication to the private ledger block chain.

Secure update process 400 may include an optional public ledger hashing process 408. Public ledger hashing process 408 may be periodically performed by hashing engine 120. Hashing engine 120 may, for example, perform public ledger hashing process upon the completion of a specified number of private ledger blocks, upon the completion of a contractual milestone, and/or upon the passage of a specific amount of time. Hashing engine 120 may hash all or a portion of a most recent private ledger hashed block and publish the result to the public ledger.

The foregoing provides discussion of several exemplary implementations of a secure intellectual property transaction system 101. These implementations permit intellectual property parties to create intellectual property profiles that include information about the current status of their intellectual property holdings, their resources, and their needs and desires in a collaboration. The secure intellectual property transaction system 101 may assist intellectual property parties to develop relationships by facilitating a match between intellectual property parties based on their inputted intellectual property profiles and machine learning models developed from information stored by system 101. The secure intellectual property transaction system 101 may further assist intellectual property parties by providing a means to verifiably audit the progress of each party's intellectual property holdings, resources, etc., throughout the course of the intellectual property contract.

The foregoing, however, is not intended to be limiting, as many alternative implementations of the system providing additional benefits may further be provided.

Other implementations, uses and advantages of the invention will be apparent to those skilled in the art from consideration of the specification and practice of the invention disclosed herein. The specification should be considered exemplary only, and the scope of the invention is accordingly intended to be limited only by the following claims.

What is claimed is:

1. A system for managing intellectual property, the system comprising:
   a computer system comprising one or more physical processors programmed by computer program instructions that, when executed, cause the computer system to:
   receive first intellectual property information from a first party of a plurality of parties;
   analyze the first intellectual property information to create a first intellectual property profile for the first party of the plurality of parties;
   receive second intellectual property information from a second party of the plurality of parties;
   analyze the second intellectual property information to create a second intellectual property profile;
   determine a match between the first party of the plurality of parties and the second party of the plurality of parties based on a match between the first intellectual property profile and the second intellectual property profile;
   record a transaction between the first party of the plurality of parties and the second party of the plurality of parties in a first data block of an intellectual property database, the recorded transaction including at least one contract term;
   receive, from the first party of the plurality of parties and the second party of the plurality of parties, approval of the first data block to indicate the first party of the plurality of parties and the second party of the plurality of parties approve of the recorded transaction;
   perform a secure hashing operation on the first data block to create a first hashed block;
   generate a private ledger stored by nodes in a blockchain database, the private ledger being limited to the first party of the plurality of parties, the second party of the plurality of parties, and a third party of the plurality of parties designated by the first party of the plurality of parties and the second party of the plurality of parties, other parties of the plurality of parties being without access to the private ledger, the private ledger recording actions by the first party of the plurality of parties and the second party of the plurality of parties associated with the recorded transaction;
   publish the first hashed block to the private ledger, a first copy and a second copy of the private ledger being identically stored by the first party of the plurality of parties and the second party of the plurality of parties, respectively, a third identical copy of the private ledger being stored by the third party of the plurality of parties to secure integrity of the recorded transaction, and
   publish a portion of the private ledger to a public ledger in the blockchain database, copies of the public ledger being identically stored by other parties of the plurality of parties such that the other parties of the plurality of parties have access to the portion of the private ledger published to the public ledger.

2. The system of claim 1, wherein the computer system is further caused to:
- record results of a collaboration between the first party of the plurality of parties and the second party of the plurality of parties to a second data block, wherein the second data block includes at least a portion of the first hashed block,
- receive, from the first party of the plurality of parties and the second party of the plurality of parties, approval of the second data block,
- perform a secure hashing operation on the second data block to create a second hashed block, and
- publish the second hashed block to the private ledger.

3. The system of claim 2, wherein the results of the collaboration between the first party of the plurality of parties and the second party of the plurality of parties include at least one of a correspondence between the first party of the plurality of parties and the second party of the plurality of parties, a research document, and a transaction between the first party of the plurality of parties and the second party of the plurality of parties.

4. The system of claim 1, wherein the computer system is further caused to:
- perform a secure hashing operation on at least a portion of the private ledger to create a public hashed block,
- publish the public hashed block to a public ledger, and
- verify integrity of the private ledger based on the public ledger.

5. The system of claim 1, wherein the computer system is further caused to:
- perform a secure hashing operation on the first intellectual property profile of the first party of the plurality of parties to create a first party genesis block, and
- perform a secure hashing operation on the second intellectual property profile of the second party of the plurality of parties to create a second party genesis block,
- wherein when the transaction between the first party of the plurality of parties and the second party of the plurality of parties recorded in the first data block is approved, the first hashed block includes at least a portion of the first party genesis block and at least a portion of the second party genesis block.

6. A computer implemented method of facilitating a secure intellectual property transaction, the method being implemented in a computer system having one or more physical processors programmed with computer program instructions that, when executed by the one or more physical processors, cause the computer system to perform the method, the method comprising:
- receiving, by the computer system, first intellectual property information from a first party of a plurality of parties;
- analyzing, by the computer system, the first intellectual property information to create a first intellectual property profile for the first party of the plurality of parties;
- receiving, by the computer system, second intellectual property information from a second party of the plurality of parties;
- analyzing, by the computer system, the second intellectual property information to create a second intellectual property profile;
- determining, by the computer system, a match between the first party of the plurality of parties and the second party of the plurality of parties based on a match between the first intellectual property profile and the second intellectual property profile;
- recording, by the computer system, a transaction between the first party of the plurality of parties and the second party of the plurality of parties in a first data block of an intellectual property database, the recorded transaction including at least one contract term;
- receiving, by the computer system, from the first party of the plurality of parties and the second party of the plurality of parties, approval of the first data block;
- performing, by the computer system, a secure hashing operation on the first data block to create a first hashed block;
- generating, by the computer system, a private ledger stored by nodes in a blockchain database, the private ledger being limited to the first party of the plurality of parties, the second party of the plurality of parties, and a third party of the plurality of parties designated by the first party of the plurality of parties and the second party of the plurality of parties, other parties of the plurality of parties being without access to the private ledger, the private ledger recording actions by the first party of the plurality of parties and the second party of the plurality of parties associated with the recorded transaction;
- publishing, by the computer system, the first hashed block to the private ledger, a first copy and a second copy of the private ledger being identically stored by the first party of the plurality of parties and the second party of the plurality of parties, respectively, a third identical copy of the private ledger being stored by the third party of the plurality of parties to secure integrity of the recorded transaction; and
- publishing, by the computer system, a portion of the private ledger to a public ledger in the blockchain database, copies of the public ledger being identically stored by other parties of the plurality of parties such that the other parties of the plurality of parties have access to the portion of the private ledger published to the public ledger.

7. The method of claim 6, the method further comprising:
- recording, by the computer system, results of a collaboration between the first party of the plurality of parties and the second party of the plurality of parties to a second data block, wherein the second data block includes at least a portion of the first hashed block,
- receiving, by the computer system and from the first party of the plurality of parties and the second party of the plurality of parties, approval of the second data block,
- performing, by the computer system, a secure hashing operation on the second data block to create a second hashed block, and
- publishing, by the computer system, the second hashed block to the private ledger.

8. The method of claim 7, wherein the results of the collaboration between the first party of the plurality of parties and the second party of the plurality of parties include at least one of a correspondence between the first party of the plurality of parties and the second party of the plurality of parties, a research document, and a transaction between the first party of the plurality of parties and the second party of the plurality of parties.

9. The method of claim 6, further comprising:
- performing, by the computer system, a secure hashing operation on at least a portion of the private ledger to create a public hashed block,
- publishing, by the computer system, the public hashed block to a public ledger, and verifying, by the computer system, integrity of the private ledger based on the public ledger.

10. The method of claim 6, further comprising:

performing, by the computer system, a secure hashing operation on the first intellectual property profile of the first party of the plurality of parties to create a first party genesis block, and performing, by the computer system, a secure hashing operation on the second intellectual property profile of the second party of the plurality of parties to create a second party genesis block, wherein when the transaction between the first part of the plurality of parties and the second party of the plurality of parties recorded in the first data block is approved, the first hashed block includes at least a portion of the first party genesis block and at least a portion of the second party genesis block.

11. The system of claim 1, wherein the third party of the plurality of parties is selected as a neutral party by the first party of the plurality of parties and the second party of the plurality of parties, and the third party of the plurality of parties stores ledger party keys to enforce terms of the recorded transaction.

\* \* \* \* \*